(12) United States Patent
Sakashita et al.

(10) Patent No.: US 8,439,996 B2
(45) Date of Patent: May 14, 2013

(54) INDOOR UNIT OF AIR CONDITIONER

(75) Inventors: Akihiko Sakashita, Osaka (JP);
Morimichi Okada, Fukuoka (JP)

(73) Assignee: Daikin Industries, Ltd., Osaka (JP)

( * ) Notice: Subject to any disclaimer, the term of this patent is extended or adjusted under 35 U.S.C. 154(b) by 22 days.

(21) Appl. No.: 12/808,617

(22) PCT Filed: Dec. 16, 2008

(86) PCT No.: PCT/JP2008/003786
§ 371 (c)(1),
(2), (4) Date: Jun. 16, 2010

(87) PCT Pub. No.: WO2009/078170
PCT Pub. Date: Jun. 25, 2009

(65) Prior Publication Data
US 2011/0120170 A1    May 26, 2011

(30) Foreign Application Priority Data

Dec. 17, 2007  (JP) .................................. 2007-324868
Jan. 25, 2008  (JP) .................................. 2008-015644

(51) Int. Cl.
*B01D 46/00*    (2006.01)
(52) U.S. Cl.
USPC ............. 55/295; 55/385.2; 55/467.1; 55/471; 55/428
(58) Field of Classification Search ............ 62/157–158, 62/259.1–263, 298–319; 165/95, 4–10, DIG. 10, 165/DIG. 11, DIG. 85; 55/289, 385.2, 428, 55/429.466, 471, 478, 295–300
See application file for complete search history.

(56) References Cited

U.S. PATENT DOCUMENTS 3,221,479 A * 12/1965 Moser et al. .................... 55/296
5,958,114 A *  9/1999 Sunahara et al. ............... 96/417

FOREIGN PATENT DOCUMENTS

| EP | 1795819 A1 | 6/2007 |
| JP | 4-129032 U | 11/1992 |
| JP | 2002-357398 A | 12/2002 |
| JP | 2005-83612 A | 3/2005 |
| JP | 2006-214663 A | 8/2006 |
| WO | WO 2007060920 A1 * | 5/2007 |

* cited by examiner

*Primary Examiner* — Duane Smith
*Assistant Examiner* — Thomas McKenzie
(74) *Attorney, Agent, or Firm* — Birch, Stewart, Kolasch & Birch, LLP

(57) ABSTRACT

An indoor unit of an air conditioner includes: a casing (10); an indoor fan (21); an air filter (30); an inlet port (24) in which the air filter (30) is attached, and a divider plate (25) for dividing space in the casing (10) into a room upstream of air passing through the air filter (30) and a room downstream of air passing through the air filter (30). The indoor unit conditions room air sucked into the casing (0) through the air filter (30). The indoor unit includes a rotating brush (51) for removing dust trapped on the air filter (30), and a dust container (90) for containing the removed dust. An access opening (70) which allows for checking of an electrical component box (72) in the casing (10) is formed in the divider plate (25), and an access lid (71) for closing the access opening (70) is provided.

5 Claims, 9 Drawing Sheets

(A)

(B)

(C)

INDOOR UNIT OF AIR CONDITIONER

TECHNICAL FIELD

The present invention relates to indoor units of air conditioners, particularly to measures to perform maintenance of the inside of a casing.

BACKGROUND ART

Indoor units of air conditioners having an air filter at an air inlet have been known. In an indoor unit of this type, an air blowing fan and a drive motor are arranged substantially in the center of a casing, a heat exchanger is arranged outside the air blowing fan, a front panel having a suction grille is arranged on the front side of the casing, and an air guider is arranged between the front panel and the air blowing fan. Room air is sucked through the suction grille by the air blowing fan, and is supplied to the heat exchanger through the air guider. Then, the air that exchanged heat in the heat exchanger is blown out through outlets formed in the front panel outside the suction grille.

A measure to maintain electrical components arranged inside the indoor unit is described in, e.g., Patent Document 1. Patent Document 1 discloses an indoor unit of an air conditioner including an air filter attached to an air inlet, and a dust removing section for removing dust trapped on the air filter, wherein a claw is formed on a tray to which the air filter is attached, and is inserted in an engagement hole of a drive member. The tray is rotated downward by detaching the claw from the engagement hole, thereby allowing for maintenance of the inside of the casing.

Patent Document 1: Japanese Patent Publication No. 2005-83612

SUMMARY OF THE INVENTION

Technical Problem

In the indoor unit of the air conditioner of Patent Document 1, the tray is wholly rotated downward for the maintenance. Therefore, a separator section for separating a suction nozzle constituting the dust removing section from the air filter, and a rotator section for rotating the tray are required. This makes the structure of the indoor unit complicated.

In view of the foregoing, the present invention has been achieved. An object of the invention is to improve ease of maintenance of the inside of the casing by a simple structure.

Solution to the Problem

A first aspect of the invention is directed to an indoor unit of an air conditioner including: a casing (10); an indoor fan (21) contained in the casing (10); an air filter (30) through which air sucked into the casing (10) by the indoor fan (21) passes; a divider member (25) which includes an inlet port (26) in which the air filter (30) is attached, and divides space in the casing (10) into a room upstream of the air filter (30) and a room downstream of the air filter (30) in the direction of an air flow, wherein room air sucked into the casing (10) through the air filter (30) is conditioned. The indoor unit of the air conditioner of the first aspect of the invention includes a dust removing section (50) for removing dust trapped on the air filter (30), and the divider member (25) includes an opening (70) which allows for checking of the inside of the casing (10), and a lid member (71) for closing the opening (70).

According to the first aspect of the invention, the indoor fan (21) sucks the room air into the casing (10) through the air filter (30) in normal operation. The sucked air is conditioned in the casing (10), and is blown outside. For maintenance of the inside of the casing (10), the lid member (71) attached to the opening (70) formed in the divider member (25) is detached, and checking is performed through the opening (70).

In a second aspect of the invention related to the first aspect of the invention, an electrical component box (72) containing electrical components of the indoor unit (1) is arranged in the casing (10) downstream of the opening (70) in the direction of the air flow.

According to the second aspect of the invention, the lid member (71) attached to the opening (70) formed in the divider member (25) is detached, and the electrical components in the electrical component box (72) are checked through the opening (70).

In a third aspect of the invention related to the first aspect of the invention, the divider member (25) includes a single open region obtained by connecting the opening (70) and the inlet port (26).

According to the third aspect of the invention, the lid member (71) attached to the opening (70) formed in the divider member (25) is detached, and the checking is performed through the single open region formed by the opening (70) and the inlet port (26).

In a fourth aspect of the invention related to the first aspect of the invention, the lid member (71) is attached to the divider member by a fixing member (74) fixed from an upstream side of in the direction of the air flow.

According to the fourth aspect of the invention, the lid member (71) is fixed to the upstream side of the opening (70) formed in the divider member (25) in the direction of the air flow. For checking the inside of the casing (10), the lid member (71) is detached on the upstream side in the direction of the air flow, and the checking is performed through the opening (70).

In a fifth aspect of the invention related to the first aspect of the invention, a dust container (90) for containing the dust which is removed by the dust removing section (50), and is transferred through a transfer passage (88) is detachably attached to an upstream side of the divider member (25) in the direction of the air flow, and the opening (70) is formed in the divider member (25) to correspond to the dust container (90).

According to the fifth aspect of the invention, the dust trapped on the air filter (30) is removed by the dust removing section (50). The removed dust is transferred through the transfer passage (88), and is contained in the dust container (90). For checking the inside of the casing (10), the dust container (90) is detached from the divider member (25), and the checking is performed through the opening (70) formed in the divider member (25) to correspond to the dust container (90)

In a sixth aspect of the invention related to the third aspect of the invention, the divider plate (25) includes a plurality of ribs (27) which press a downstream side of the air filter (30) in the direction of the air flow, and extend radially outward from a center of the inlet port (26), and an end of at least one of the plurality of ribs (27) is attached to an edge of the inlet port (26), and an end of at least one of the plurality of ribs (27) is attached to an edge of the opening (70).

According to the sixth aspect of the invention, the plurality of ribs (27) press the downstream side of the air filter (30) in the direction of the air flow, and an end of at least one of the ribs (27) supports the edge of the opening (70).

Advantages of the Invention

According to the present invention, the opening (70) is formed in the divider member (25), thereby allowing for checking of the inside of the casing (10) through the opening (70). Further, the lid member (71) for closing the opening (70) is attached to the divider member (25), thereby allowing for reliably preventing entrance of the room air to the inside of the casing (10) through the opening (70) in the normal operation. This improves ease of maintenance of the inside of the casing (10).

According to the second aspect of the invention, the electrical component box (72) containing the electrical components of the indoor unit (1) is arranged on the downstream side of the opening (70) formed in the divider member (25) in the direction of the air flow. Therefore, when the lid member (71) attached to the divider member (25) is removed, the electrical components contained in the electrical component box (72) can be checked through the opening (70). This improves ease of maintenance of the inside of the casing (10).

According to the third aspect of the invention, the inlet port (26) and the opening (70) formed in the divider member (25) are connected into a single open region. Therefore, an area of the opening formed in the divider member (25) can be increased. This increases working space for the checking of the inside of the casing (10), thereby improving ease of maintenance of the inside of the casing (10).

According to the fourth aspect of the invention, the lid member (71) is attached to the divider member (25) by the fixing member (74) fixed from the upstream side of in the direction of the air flow. Therefore, the checking of the inside of the casing (10) can be performed from the upstream side in the direction of the air flow.

According to the fifth aspect of the invention, the divider member (25) includes the opening (70) formed to correspond to the dust container (90). Thus, when the dust container (90) is detached, the checking of the inside of the casing (10) can be performed through the opening (70). Since the position of dust container (90) and the position of the opening (70) relative to the divider member (25) are not separated, an area of the divider member (25) can be reduced.

According to the sixth aspect of the invention, the plurality of ribs (27) support the divider plate (25) while connecting the edge of the inlet port (25) and the edge of the opening (70). This increases rigidity of the divider plate (25) at the edge of the opening (70). Thus, the lid member (71) can reliably be attached to the edge of the opening (70).

DESCRIPTION OF EMBODIMENTS

Embodiments of the present invention will be described below with reference to the drawings.

Figure 1:
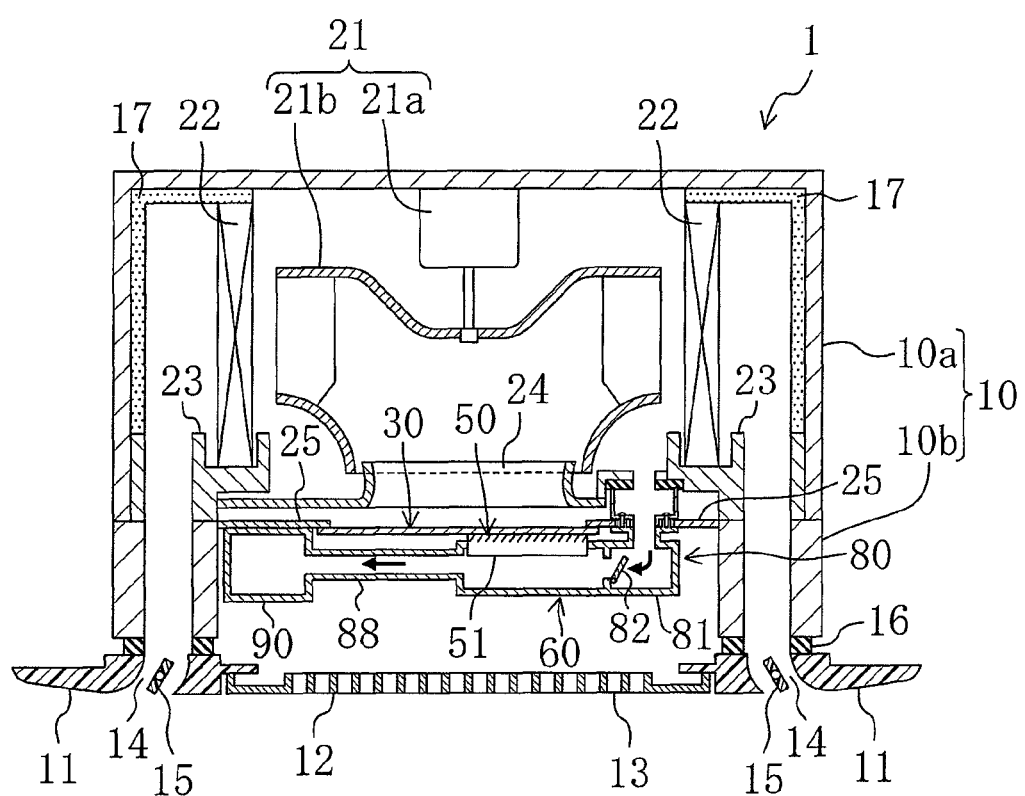
FIG. 1 is a vertical cross-sectional view illustrating an indoor unit of an embodiment of the invention.
Figure 2:
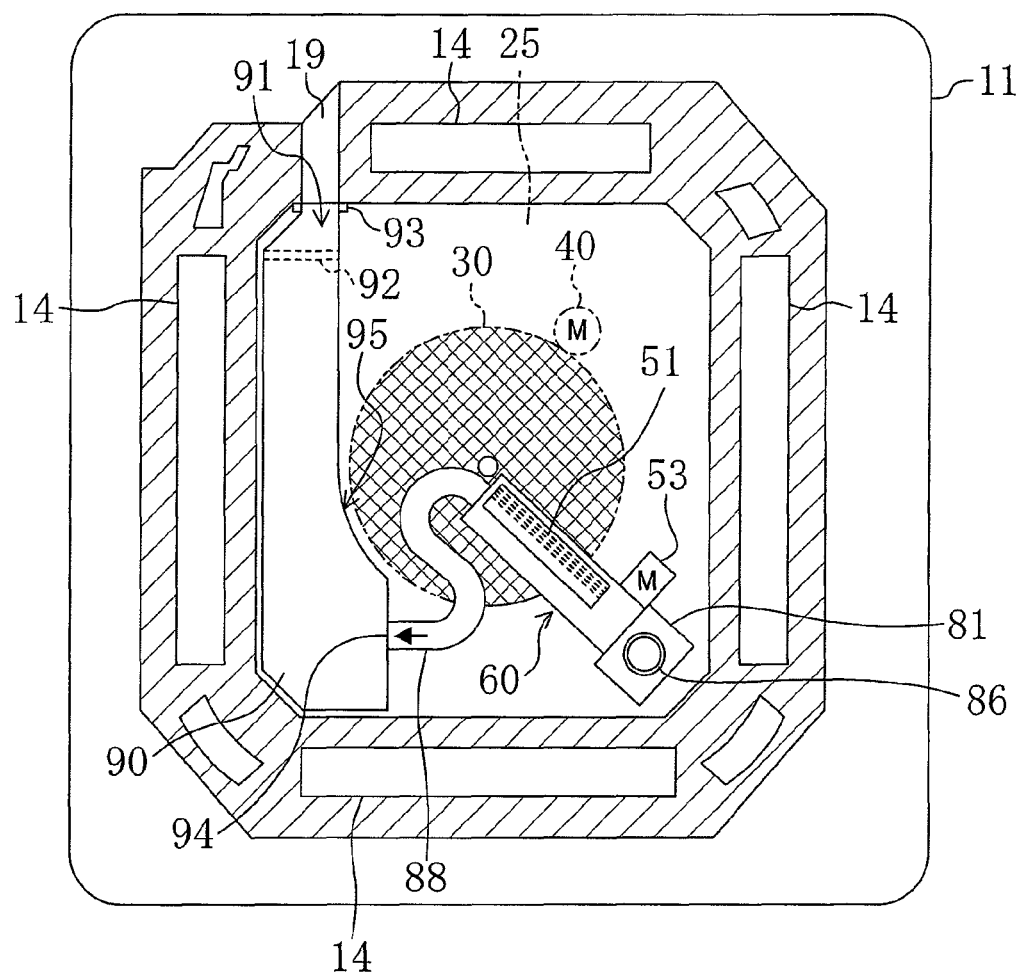
FIG. 2 is a horizontal cross-sectional view illustrating the indoor unit of the embodiment.

As shown in FIGS. 1 and 2, an indoor unit (1) of the present embodiment constitutes part of an air conditioner, and is placed on a ceiling of a room. The air conditioner includes a refrigerant circuit connecting a compressor, an outdoor heat exchanger, and an expansion valve provided in an outdoor unit, and an indoor heat exchanger (22) provided in the indoor unit (1) using pipes. The refrigerant circuit performs a vapor compression refrigeration cycle by reversibly circulating a refrigerant. The air conditioner performs cooling operation where the indoor heat exchanger (22) in the refrigerant circuit functions as an evaporator, and heating operation where the indoor heat exchanger (22) in the refrigerant circuit functions as a condenser.

Figure 3:
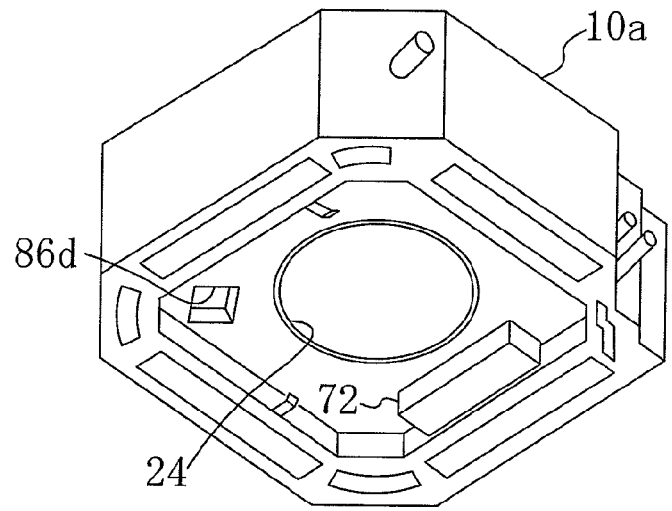
FIG. 3(A) is a schematic perspective view illustrating an upper casing of the embodiment.
FIG. 3(B) is a schematic perspective view illustrating a lower casing of the embodiment.
FIG. 3(C) is a schematic perspective view illustrating a decorative panel of the embodiment.
Figure 3:
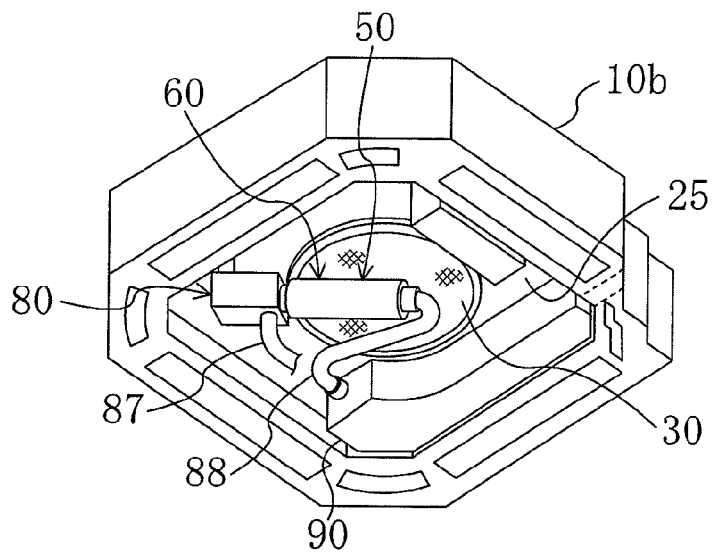
Figure 3:
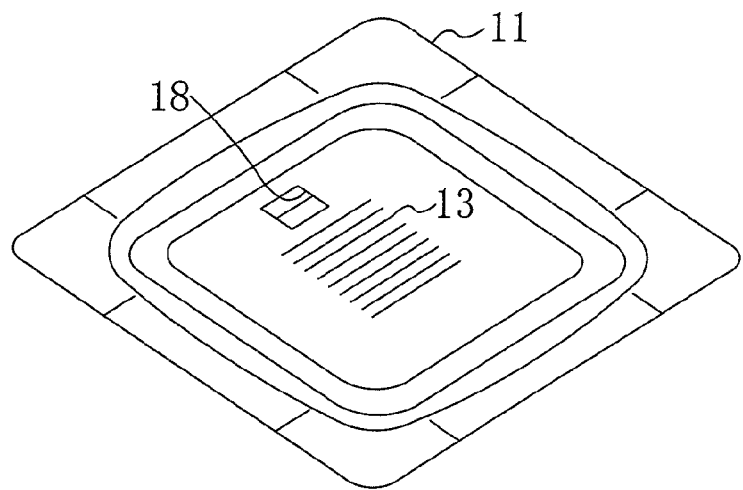

As shown in FIGS. 3(A) to 3(C), the indoor unit (1) includes a casing (10), and a decorative panel (11). The casing (10) is in the shape of a substantially rectangular parallelepiped box with an open bottom, and the decorative panel (11) is attached to a lower portion of the casing (10).

The decorative panel (11) is in the shape of a rectangular plate as shown in FIGS. 1, 2 and 3(C). When viewed in plan, the decorative panel (11) is slightly larger than the casing (10). The decorative panel (11) is attached to the casing (10) to cover the lower portion of the casing (10) with a sealing member (16) sandwiched therebetween. The decorative panel (11), when attached to a lower casing (10b), is exposed in the room.

The decorative panel (11) is provided with one inlet (13), four outlets (14), and a cleaner insertion hole (18). The inlet (13) is rectangular-shaped, and is formed in the center of the decorative panel (11). A suction grille (12) provided with slits is fitted in the inlet (13). Each of the outlets (14) is in the shape of a narrow rectangle. The outlets (14) are formed along the sides of the decorative panel (11), respectively. An adjuster plate (15) for adjusting the direction of air flow is provided at each of the outlets (14). The adjuster plate (15) rotates to adjust the direction of air flow (the direction of blowing air). The cleaner insertion hole (18) is rectangular-shaped, and is provided on the side of the inlet (13).

The casing (10) includes an upper casing (10a) and a lower casing (10b), and the lower casing (10b) is integrally attached to a lower portion of the upper casing (10a).

The upper casing (10a) is in the shape of a substantially rectangular parallelepiped box. A heat insulator (17) is laminated on an inner surface of the upper casing (10a). A bell mouth (24) is formed on a lower end surface of the upper casing (10a) to communicate with an air hole (26) described later formed in the lower casing (10b). The upper casing (10a) contains the indoor heat exchanger (22), a drain pan (23), and an indoor fan (21).

The indoor fan (21) is a so-called turbo fan. The indoor fan (21) is arranged near the center of the upper casing (10a), and is located immediately above the bell mouth (24). The indoor fan (21) includes a fan motor (21a) and an impeller (21b). The fan motor (21a) is fixed to a top plate of the upper casing (10a). The impeller (21b) is coupled to a rotation shaft of the fan motor (21a). A bell mouth (24) is arranged below the indoor fan (21), and divides space in the casing (10) upstream of the indoor heat exchanger (22) into a room near the indoor fan (21), and a room near the suction grille (12). The indoor fan (21) is configured to blow air sucked from below through the bell mouth (24) in a circumferential direction of rotation of the indoor fan (21).

The indoor heat exchanger (22) is configured as a cross-fin type fin-and-tube heat exchanger. When viewed in plan, the indoor heat exchanger (22) is rectangular, and is arranged to surround the indoor fan (21). In the indoor heat exchanger (12), a refrigerant and room air (blown air) sent by the indoor fan (21) exchange heat.

The drain pan (23) is arranged below the indoor heat exchanger (22). The drain pan (23) receives drainage generated as a result of condensation of moisture in the air in the indoor heat exchanger (22). The drain pan (23) is provided with a drain pump (not shown) for discharging the drainage. The drain pan (23) is inclined so that the drainage is collected to part of the drain pan at which the drain pump is provided.

Figure 6:
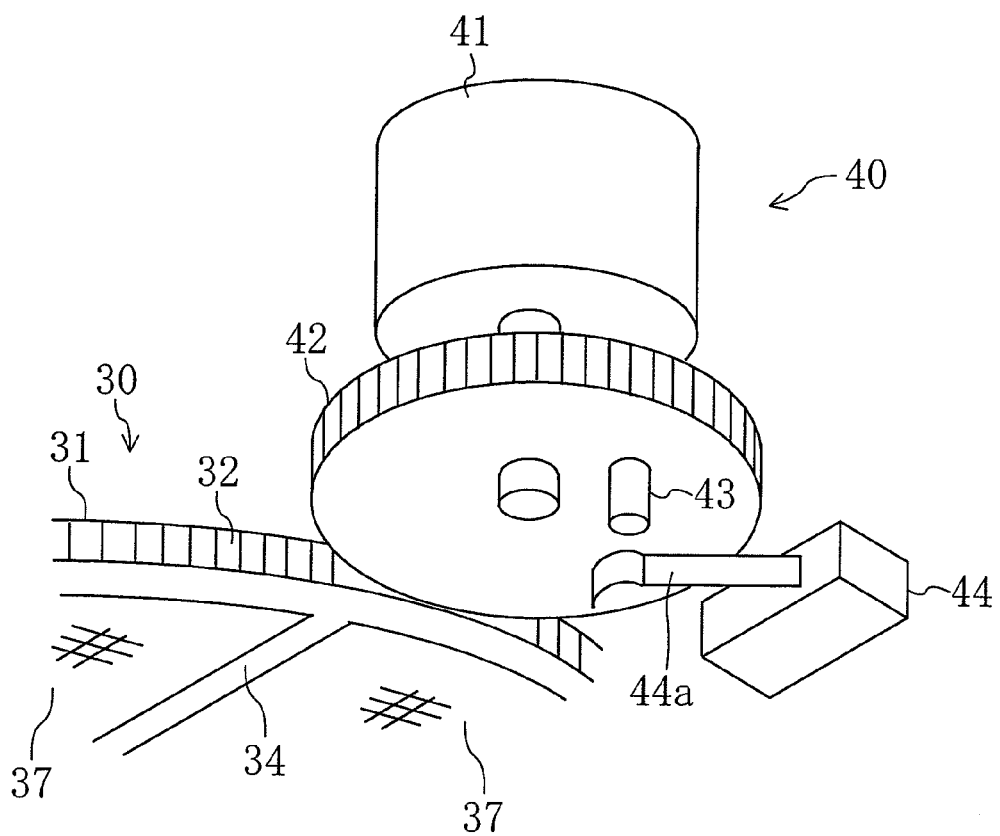
FIG. 6 is a schematic perspective view illustrating a filter drive section of the present embodiment.

The lower casing (10b) is in the shape of a substantially rectangular parallelepiped box having an open bottom, and is attached to the lower portion of the upper casing (10a). An upper end surface of the lower casing (10b) constitutes a divider plate (25) described later. The lower casing (10b) contains, as shown in FIGS. 4 and 6, an air filter (30), a filter drive section (40), a dust removing section (50), a dust collecting case (60), a dust transfer section (80), and a dust container (90).

Figure 4:
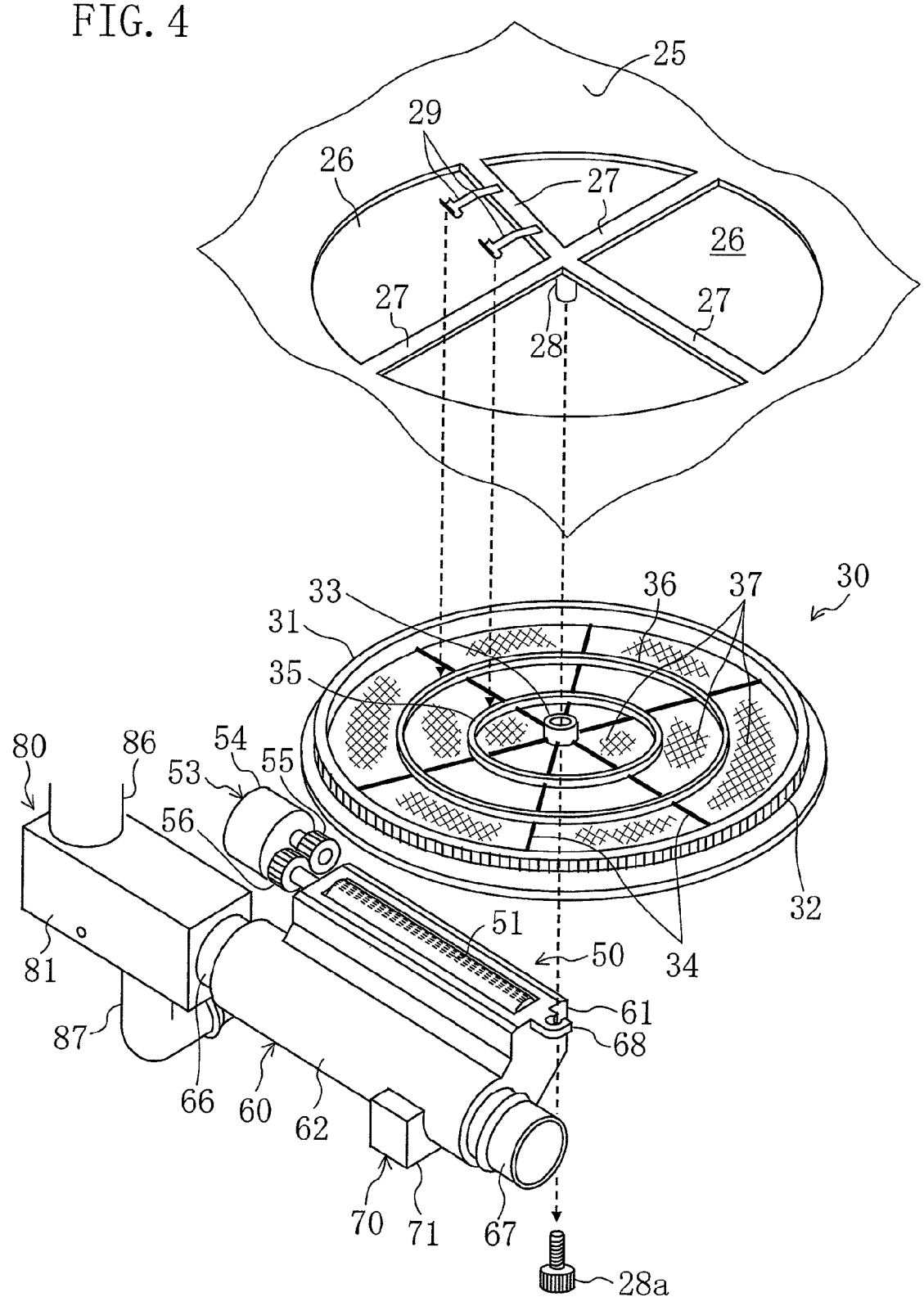
FIG. 4 is a schematic perspective view illustrating an air filter, a dust removing section, a dust collecting case, and a dust transfer section of the present embodiment.

As shown in FIGS. 1 and 4, the air filter (30) is arranged below the center of the divider plate (25), and is in the shape of a circle having a size enough to cover the air hole (26) formed in the divider plate (25). Specifically, the air filter (30) includes an annular filter body (31) and a mesh member (37). A gear (32) is formed on an outer circumferential surface of the filter body (31), and a cylindrical axis receiver (33) supported by six radial ribs (34) is formed in the center of the annular filter body (31). Specifically, each of the radial ribs (34) radially extends from the axis receiver (33). Further, an inner annular rib (35) and an outer annular rib (36) coaxial with the filter body (31) are formed radially inside the filter body (31). The outer annular rib (36) has a larger diameter than the inner annular rib (35). The mesh member (37) covers the whole part of the inside of the filter body (31). The air sucked through the inlet (13) passes through the mesh member (37), and flows into the bell mouth (124). The dust contained in the air is trapped on the mesh member (37).

Figure 5:
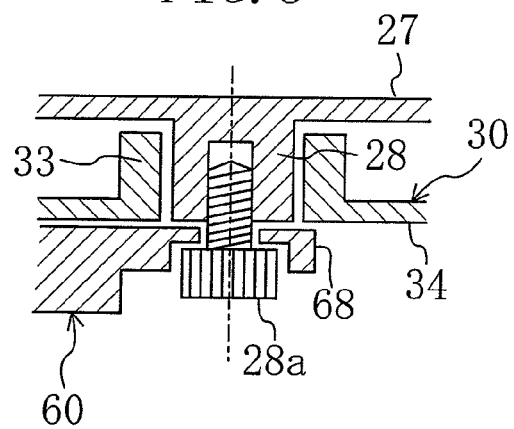
FIG. 5 is a cross-sectional view illustrating how the air filter and the dust collecting case of the present embodiment are attached.

The air filter (30) is biased downward when filter holders (29) abut the radial ribs (35, 36). Therefore, the air filter (30) is pressed onto a rotating brush (51) of the dust removing section (50) described later. This improves efficiency of dust removal by the dust removing section (50). As shown in FIG. 5, the air filter (30) is attached by fitting the axis receiver (33) on a filter rotation axis (28) of the divider plate (25). The air filter (30) is rotatable about the filter rotation axis (28). The dust collecting case (60) is arranged below the air filter (30).

With the axis receiver (33) of the air filter (30) fitted on the filter rotation axis (28), a filter attachment (68) of the dust collecting case (60) is fixed to the filter rotation axis (28) of the divider plate (25) with a fixing screw (28a). Thus, the air filter (30) is held between the divider plate (25) and the dust collecting case (60).

A filter drive section (40) for driving the air filter (30) to rotate is provided near the air filter (30) (see FIG. 2). The filter drive section (40) includes a filter drive motor (41), and a limit switch (44) as shown in FIG. 6. A drive gear (42) is attached to a drive shaft of the filter drive motor (41), and the drive gear (42) engages with the gear (32) of the filter body (31). A switch actuator (43), which is a protrusion, is formed on one of the surfaces of the drive gear (42). The switch actuator (43) actuates a lever (44a) of the limit switch (44) in response to the rotation of the drive gear (42). The limit switch (44) detects the actuation of the lever (44a) by the switch actuator (43). That is, the switch actuator (43) and the limit switch (44) detect the rotational position of the drive gear (42).

The dust removing section (50), the dust collecting case (60), and the dust transfer section (80) will be described below with reference to FIGS. 4 to 7. The dust removing section (50), the dust collecting case (60), and the dust transfer section (80) are arranged below the divider plate (25) and the air filter (30) (see FIGS. 1 and 2).

The dust removing section (50) is provided to remove the dust trapped on the air filter (30). The dust removing section (50) includes a rotating brush (51) as a brush member, and a brush driving section (53) for rotating the rotating brush (51). As shown in FIG. 4, the rotating brush (51) is arranged in a brush receiving opening of the dust collecting case (60) described later. The rotating brush (51) includes a narrow cylindrical shaft portion, and a bristle portion attached to an outer circumferential surface of the shaft portion. The bristle portion covers the circumference of the shaft portion, and extends in the longitudinal direction of the shaft portion.

A length of the rotating brush (51) is the same as or greater than the radius of the air filter (30). The rotating brush (51) is arranged to extend radially outward from the center of the air filter (30). The rotating brush (51) is configured in such a manner that the dust is removed from the mesh member (37) by the bristle portion coming into contact with the mesh member (37) of the rotating air filter (30). The rotating brush (51) is driven by the brush driving section (53) to rotate in a reversible manner. The brush driving section (53) includes a brush drive motor (54), and a drive gear (55) and a driven gear (56) engaging with each other. The drive gear (55) is attached to a drive shaft of the brush drive motor (54), and the driven gear (56) is attached to an end of the shaft portion of the rotating brush (51). The gears engage with each other to rotate, thereby driving the rotating brush (51) to rotate. The bristle portion of the rotating brush (51) is made of so-called pile fabric. The pile fabric is hairy fabric obtained by weaving an extra fiber (pile yarn) into base fabric, and has relatively short bristles projecting from the base fabric. The pile fabric is inclined pile fabric in which the bristles are inclined in a certain direction.

The dust collecting case (60) temporarily contains the dust removed from the rotating brush (51) by a cleaning brush which is not shown. The dust collecting case (60) is a columnar container. An upper portion of the dust collecting case (60) is a remover portion (61) which removes the dust on the air filter (30), and a lower portion is a collector portion (62) which collects the dust removed from the air filter (30).

A brush receiving opening is formed in a top plate of the removal portion (61) to extend in the longitudinal direction of the dust collecting case (60), and the rotating brush (51) is arranged in the brush receiving opening as described above. The above-described filter attachment (68) is formed at an end of the removal portion (61). A lower portion (a bottom) of the collector portion (62) is convex curved. The dust removed from the rotating brush (51) by the cleaning brush falls in, and is collected in the convex curved portion of the collector portion (62). Longitudinal ends (66, 67) of the collector portion (62) are opened. A first end (66) of the collector portion (62) is connected to a damper box (81) of a dust transfer section (80) described later, and a second end (67) is connected to a transfer duct (88) of a dust transfer section (80) described later. Although not shown, the dust collecting case (60) includes a dust amount detector for detecting the amount of dust contained in the collector portion (62).

Figure 7:
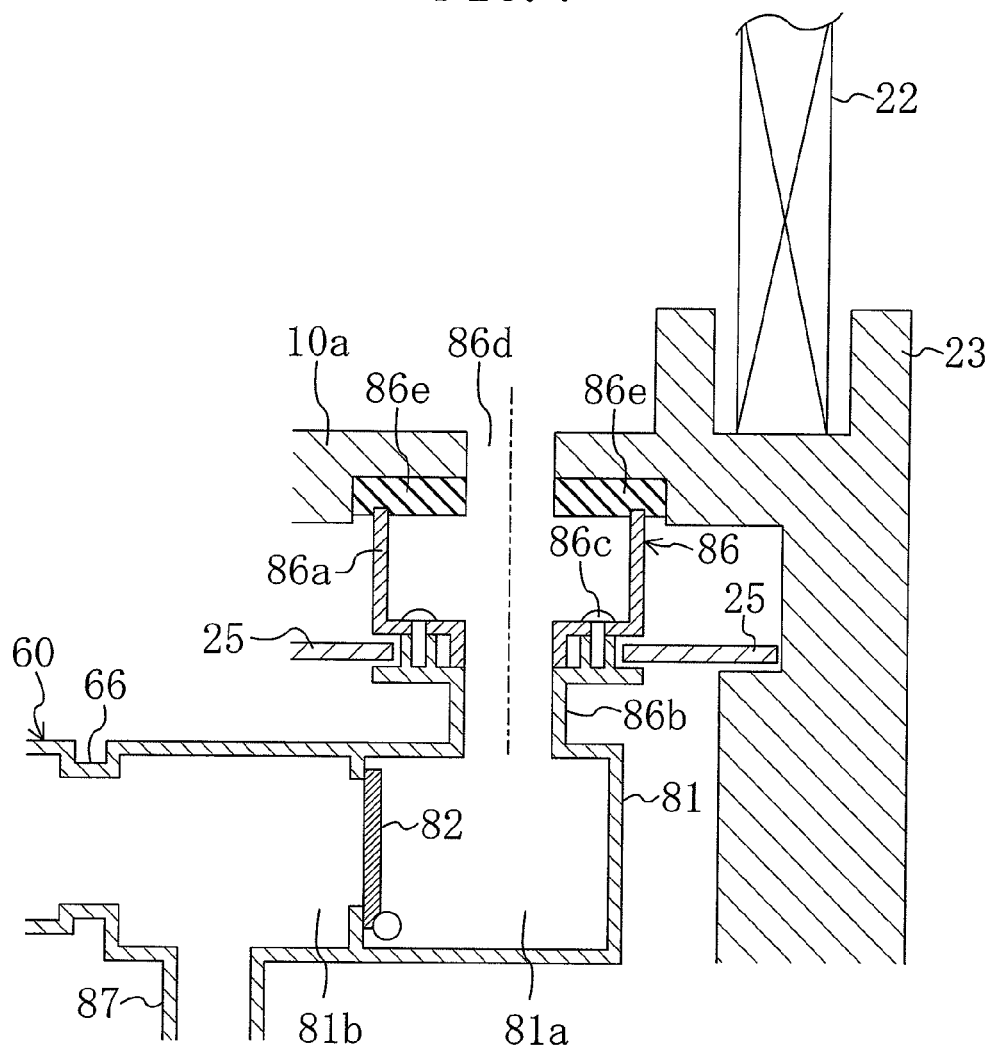
FIG. 7 is a cross-sectional view illustrating part of the dust transfer section of the embodiment.

The dust transfer section (80) includes the damper box (81) and the transfer duct (88) described above, an entrance duct (86), and a suction duct (87) as shown in FIGS. 2, 4, and 7.

The damper box (81) is in the shape of a rectangular parallelepiped extending in the longitudinal direction of the collector portion (62) of the dust container (60) as shown in FIG. 7. The first end (66) of the collector portion (62) is connected to a longitudinal end of the damper box (81). The damper box (81) contains a damper (82) as an opening/closing member. Closing the damper (82) divides space inside the damper box (81) into rooms aligned in the longitudinal direction. Specifically, the space inside the damper box (81) is divided into a first room (81a) and a second room (81b). As described above, the first end (66) of the collector portion (62) is connected to the second room (81b).

The entrance duct (86) is connected to an upper surface of the damper box (81), and communicates with the first room (81a). As shown in FIG. 7, the entrance duct (86) extends vertically upward from the damper box (81), and penetrates the divider plate (25). The entrance duct (86) includes an upstream duct (86a) and a downstream duct (86b), both of which are circular when viewed in a lateral cross-sectional view. The two ducts (86a, 86b) are attached to the divider plate (25) with fixing screws (86c). A lateral cross-sectional area (a flow path area) of the upstream duct (86a) is larger than a lateral cross-sectional area (a flow path area) of the downstream duct (86b). A lower end portion of the downstream duct (86b) (a lower end portion in FIG. 7) is connected to the damper box (81), and communicates with the inside of the damper box. An upper end portion of the upstream duct (86a) (an upper end portion in FIG. 7) is in contact with a lower surface of the bell mouth (24) with a sealing member (86e) interposed therebetween. An inlet (86d) as a through hole is formed in the lower end surface of the upper casing (10a).

Figure 9:
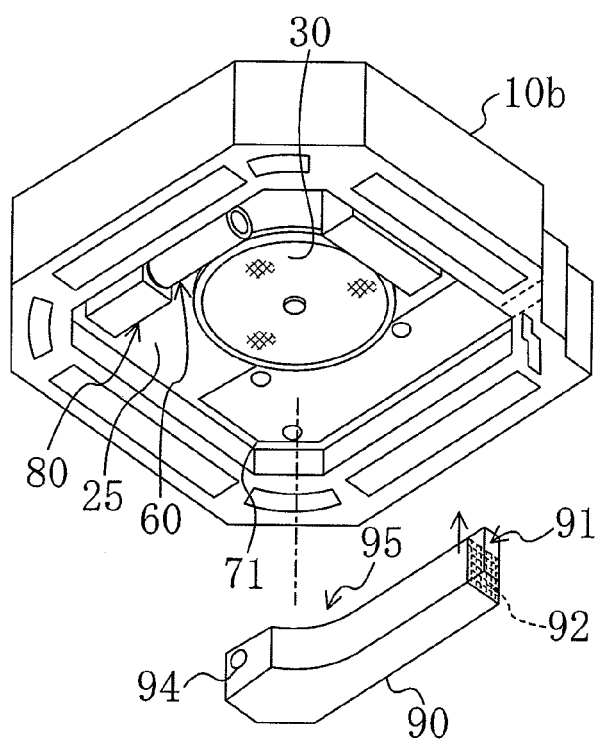
FIG. 9 is a schematic perspective view illustrating the lower casing of the present embodiment with a dust container detached for maintenance.

The upstream duct (86a) communicates with the room including the indoor fan (21) through the inlet (86d). Specifically, the entrance duct (86) brings the air blown from the indoor fan (21) into the damper box (81). A junction between the upstream duct (86a) and the downstream duct (86b) of the entrance duct (86) is located in a through hole formed in the divider plate (25). Specifically, the ducts (86a, 86b) are connected in such a manner that a bottom plate of the upstream duct (86a) and an upper flange of the downstream duct (86b) sandwich the edge of the through hole in the divider plate (25). As shown in FIG. 9, the junction and the sealing member (86e) are configured in such a manner that the entrance duct (86), the damper box (81), and the dust collecting case (60) rotate together about the axial center of the entrance duct (86).

An inlet end of the suction duct (87) is connected to the lower surface of the damper box (81), and communicates with the second room (81b). The other outlet end of the suction duct (87) is connected to the cleaner insertion hole (18) formed in the decorative panel (11). The cleaner insertion hole (18) is provided to receive a hose of a cleaner etc., inserted therein, thereby sucking the dust collected in the collector portion (62) of the dust collecting case (60). The suction duct (87) is made of a flexible tube.

As shown in FIGS. 1 and 2, one end of the transfer duct (88) is connected to the second end (67) of the collector portion (62) of the dust collecting case (60), and the other end is connected to a dust container (90) described later. The transfer duct (88) is made of a flexible tube.

In the dust transfer section (80), the damper (82) in the damper box (81) is closed in normal operation of performing cooling and heating. Therefore, the air blown from the indoor fan (21) is not introduced to the damper box (81). In the dust transfer section (80), the damper (82) in the damper box (81) is opened when the dust in the dust collecting case (60) is transferred to the dust container (90). This allows the air blown from the indoor fan (21) to enter the dust collecting case (60) through the entrance duct (86) and the damper box (81). As a result, the dust in the dust collecting case (60) is transferred to the dust container (90) together with the air through the transfer duct (88). Specifically, the dust transfer section (80) is configured to transfer the dust in the dust collecting case (60) to a predetermined location using the air blown from the indoor fan (21). Further, in the dust transfer section (80), the damper (82) in the damper box (81) is closed when the dust in the dust container (90) is discharged outside the casing (10). In this case, the dust in the dust container (90) is sucked by a cleaner inserted in the cleaner insertion hole (18) through the transfer duct (88), the damper box (81), and the suction duct (87).

As shown in FIGS. 1, 2, and 9, the dust container (90) contains the dust transferred from the dust collecting case (60). The dust container (90) is in the shape of a rather narrow, rectangular parallelepiped box. One of longitudinal end surfaces of the dust container (90) in which a dust flow port (94) described later is formed has a larger area than the other longitudinal end surface of the dust container (90) in which a discharge portion (91) is formed. An inner side surface of the dust container (90) includes an arc-shaped concave portion (95) curved along the air hole (26) so as not to overlap with the air filter (30) when viewed in plan. The dust container (90) is arranged below the divider plate (25) along one of the sides of the divider plate. Further, the dust container (90) includes at one end surface thereof a dust flow port (94) to which the transfer duct (88) is connected, and includes at the other end surface thereof a discharge portion (91) for discharging the air in the dust container (90) outside.

The dust flow port (94) has a substantially round opening, and is arranged in a lower portion of the one end surface of the dust container (90). One end of the transfer duct (88) is connected to the dust flow port (94).

The discharge portion (91) has a substantially rectangular opening, and is formed in the other end surface opposite the one longitudinal end surface to which the transfer duct (88) is connected. The discharge portion (91) is connected to a discharge passage (19) formed in the lower casing (10b), and communicates with the outside of the casing (10). A filter (92) is attached to the discharge portion (91). The filter (92) allows for discharging only the air in the dust container (90) outside. The filter (92) is detachably attached to the dust container (90) as shown in FIG. 9. A sealing member (93) is provided at a junction between the dust container (90) and the discharge passage (19). When the dust is transferred by the air from the dust collecting case (60) to the dust container (90), the air inside the dust container (90) is discharged from the discharge passage (19) through the discharge portion (91). In this case, the filter (92) does not allow the transferred dust to flow outside the casing (10) through the discharge portion (91). When the dust is sucked out of the dust container (90) by the cleaner, air pressure in the dust container (90) decreases. Then, the outside air enters the dust container (90) through the discharge passage (19). In this way, the air pressure in the dust container (90) is kept in good balance by supplying and discharging the air through the discharge portion (91), and therefore, the dust transfer operation to the dust container (90), and the dust discharge operation from the dust container (90) can suitably be performed.

The structure of the divider plate (25), which is a feature of the invention, will be described with reference to the drawings.

Figure 8:
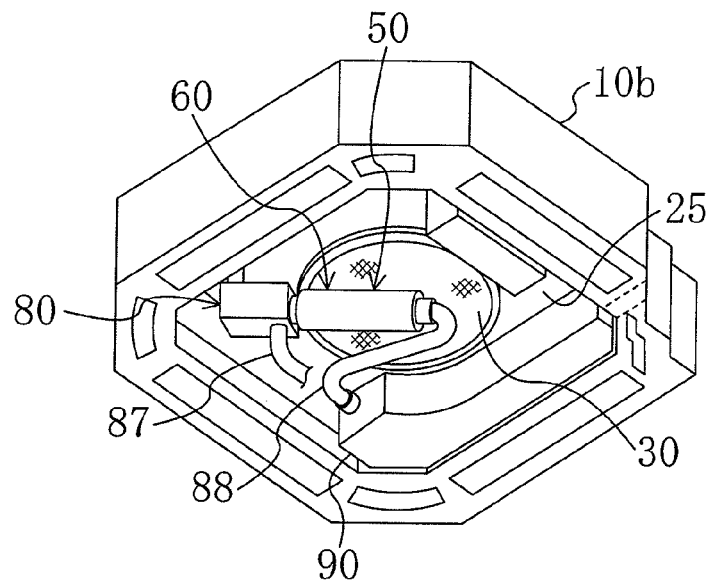
FIG. 8 is a schematic perspective view illustrating the lower casing of the embodiment.
Figure 10:
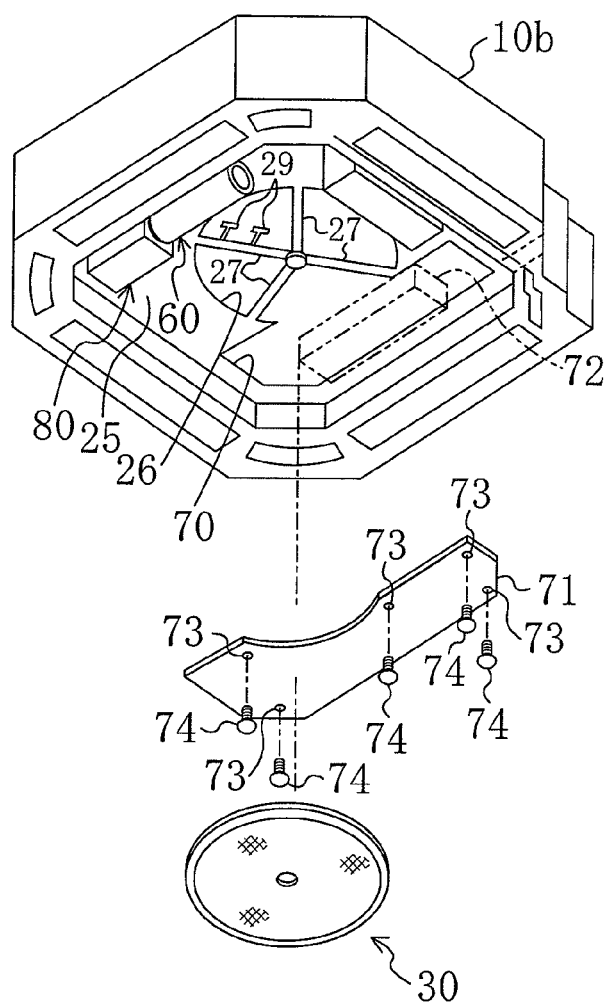
FIG. 10 is a schematic perspective view illustrating the lower casing of the present embodiment with an access lid detached for maintenance.

As shown in FIGS. 8 to 10, the divider plate (25) is in the shape of a substantially rectangular plate when viewed in plan, and constitutes the upper end surface of the lower casing (10b), and divides space between the bell mouth (24) and the suction grille (12) into an upper room and a lower room. The divider plate (25) includes an air hole (26) for introducing the outside air into the upper casing (10a), an access opening (70) which allows for checking of an electrical component box (72) arranged in the upper casing (10a), and an access lid (71) for closing the access opening (70). The air filter (30) is arranged to cover the air hole (26) from below. Specifically, the divider plate (25) is arranged to close a gap between an inner side wall of the lower casing (10b) and the air filter (30), thereby allowing the air sucked through the inlet (13) to inevitably pass through the air filter (30). Thus, with the provision of the divider plate (25), the dust which is contained in the air upstream of the divider plate can reliably be prevented from escaping from the air filter (30) and flowing to the downstream of the divider plate (25).

Figure 11:
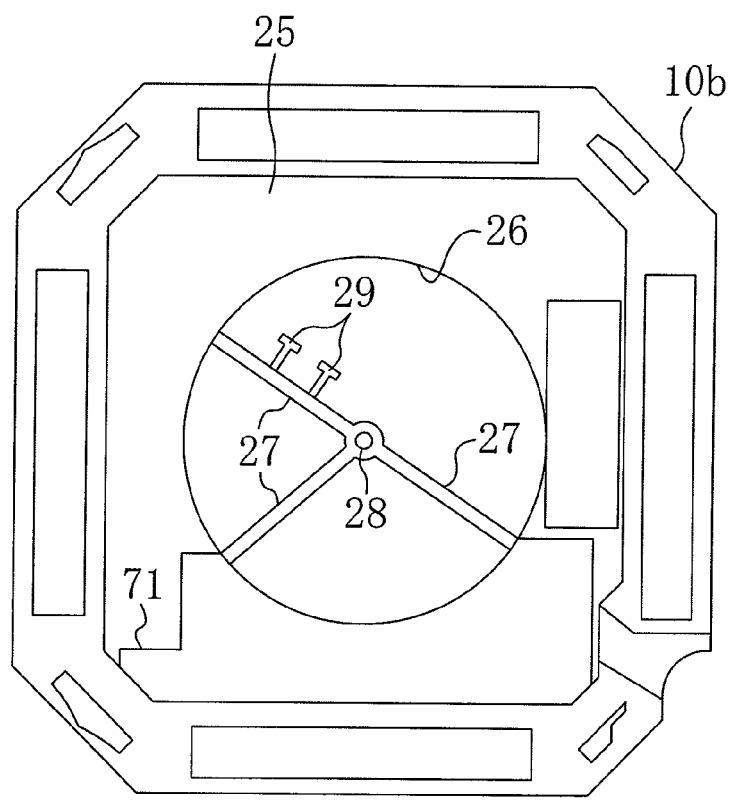
FIG. 11 is a horizontal cross-sectional view illustrating an alternative example of the indoor unit of the present embodiment.

As shown in FIG. 4, the air hole (26) is constituted of a round hole which is formed in the center of the divider plate (25). Four radial ribs (27) are provided to radially extend in the round hole, thereby dividing the round hole into fan-shaped openings. Specifically, as shown in FIG. 10, two of the radial ribs (27) are attached to the edge of the air hole (26) at one end thereof. The other two of the radial ribs (27) are attached to the edge of the access opening (70) at one end thereof. Specifically, the radial ribs (27) support the divider plate (25) while connecting the edge of the air hole (26) and the edge of the access opening (70), thereby increasing the rigidity of the divider plate (25) at the ends of the radial ribs (27). The radial ribs (27) may be constituted of three radial ribs (27) as shown in FIG. 11.

The access opening (70) is substantially in the shape of a rectangle, which is substantially the same shape as the outer shape of an upper end surface of the dust container (90), and is formed in the divider plate (25) to correspond to the dust container (90) as shown in FIGS. 9 and 10. When viewed in plan, an inner side of the access opening (70) is arc-shaped along an edge of the air hole (26), and is connected to the air hole (26) divided into fan-shaped openings, thereby forming a single opening. As shown in FIGS. 3(A) and 3(B), the electrical component box (72) containing electrical components of the indoor unit (1), which would be checked, repaired, or replaced, is arranged in the upper casing (10a) above the access opening (70) (downstream in the air flow direction). The electrical component box (72) is in the shape of a rectangular parallelepiped box which is vertically oriented rectangular-shaped when viewed in plan, and is attached to a lower end surface of the upper casing (10a).

The access lid (71) is a flat member having the same shape as the access opening (70), and is slightly larger than the access opening (70), thereby covering the access opening (70) as shown in FIG. 9. The access lid (71) includes a plurality of bolt holes (73) formed in a peripheral portion thereof, and is fixed to the divider plate (25) by fastening bolts (74) in the bolt holes (73). When viewed in plan, an inner side of the access lid (71) is arc-shaped along the edge of the air hole (26), thereby constituting part of the edge of the air hole (26) together with the divider plate (25).

Working Mechanism

Normal operation of cooling and heating the room, and filter cleaning operation of cleaning the air filter (30) performed by the indoor unit (1), and maintenance of the indoor unit (1) will be described below. The indoor unit (1) is capable of switchably performing the normal operation and the filter cleaning operation.

In the normal operation, the indoor fan (21) is driven. In the indoor unit (1), room air admitted through the inlet (13) passes through the air filter (30) to enter the bell mouth (24). When the room air passes through the air filter (30), dust in the room air is trapped on the mesh member (37) of the air filter (30). The room air that entered the bell mouth (24) is blown from the indoor fan (21). The blown air is cooled or heated as it exchanges heat with the refrigerant in the indoor heat exchanger (22), and is supplied to the inside of the room through the outlets (14). In this way, the room is cooled or heated. In this operation, the damper (82) of the damper box (81) is closed. Therefore, the air blown from the indoor fan (21) does not enter the dust collecting case (60) through the damper box (81).

The filter cleaning operation will be described below. In the filter cleaning operation, the compressor in the refrigerant circuit is suspended not to circulate the refrigerant. Further, dust removal operation, dust transfer operation, and dust discharge operation is performed in a switchable manner.

The dust removal operation is operation to remove the dust trapped on the air filter (30). In the dust removal operation, the indoor fan (21) is suspended, and the rotating brush (51) is rotated to bring the bristle portion into contact with the air filter (30). When the air filter (30) is rotated in this state, the dust on the air filter (30) is captured by the bristle portion of the rotating brush (51). When the lever (44a) of the limit switch (44) of the filter drive section (40) is actuated, the filter drive motor (41) stops, and then the air filter (30) stops. That is, the air filter (30) rotates by a predetermined angle, and then stops. In this way, the dust on a portion of the air filter (30) that passed through the bristle portion of the rotating brush (51) is removed.

The dust transfer operation is operation to transfer the dust from the dust collecting case (60) to the dust container (90). In the dust transfer operation, the rotating brush (51) is suspended, and the air filter (30) is suspended. The damper (82) of the damper box (81) is opened. In this state, the indoor fan (21) is driven, and the air blown from the indoor fan (21) sequentially passes through the entrance duct (86) and the damper box (81), and is introduced to the dust collecting case (60). Thus, the dust in the dust collecting case (60) is transferred to the dust container (90) through the transfer duct (88) together with the air.

The dust discharge operation is operation to discharge the dust in the dust container (90) outside the upper casing (10a). For example, in the dust discharge operation, the dust transfer operation is performed several times (for a predetermined period) to perform the dust discharge operation. Alternatively, the dust discharge operation may be performed using a remote controller handled by a user. In the dust discharge operation, as shown in FIG. 3(C), the user attaches the cleaner to the cleaner insertion hole (18) of the decorative panel (11). The cleaner insertion hole (18) communicates with the suction duct (87) of the damper box (81). Therefore, when the user actuates the cleaner attached to the cleaner insertion hole (18), the dust in the dust container (90) passes through the transfer duct (88) and the dust collecting case (60) to enter the damper box (81), and is sucked into the cleaner.

The maintenance of the indoor unit (1) by an operator will be described below. To perform the maintenance of the indoor unit (1), the components of the indoor units (1) are suspended.

To perform the maintenance, the suction grille (12) attached to the decorative panel (11) is detached first. Then, as shown in FIG. 9, the dust container (90) and the transfer duct (88) arranged in the lower casing (10*b*) are detached. Then, the entrance duct (86), the damper box (81), and the dust collecting case (60) are integrally rotated about the axial center of the entrance duct (86). Then, as shown in FIG. 10, the air filter (30) and the access lid (71) are detached. Thereafter, electrical components contained in the electrical component box (72) arranged in the upper casing (10*a*) are checked, repaired, replaced, etc., through the access opening (70). After the maintenance is done, the access opening (70) is closed by the access lid (71) by fixing the access lid with the bolts (74), and the air filter (30) and the dust container (90) are sequentially attached. Then, the entrance duct (86), the damper box (81), and the dust collecting case (60) are integrally rotated about the axial center of the entrance duct (86) to return to the original location, thereby attaching the transfer duct (88) to the dust container (90) and the dust collecting case (60). Finally, the suction grille (12) is attached to the decorative panel (11). Thus, the maintenance is finished.

Advantages of Embodiment according to the present embodiment, the access opening (70) is formed in the divider plate (25). Therefore, the checking of the inside of the upper casing (10*a*) can be performed without detaching the whole divider plate (25). In the upper casing (10*a*), the electrical component box (72) is arranged immediately above the access opening (70) (downstream in the air flow direction). This allows for checking of the electrical component box (72) containing the electrical components of the indoor unit (1) through the access opening (70). Further, since the access opening (70) and the air hole (26) are joined into a single open region, an area of the opening formed in the divider plate (25) can be increased. This can improve ease of maintenance of the indoor unit (1). Further, the access lid (71) is attached to the access opening (70). In addition, the access lid (71) is fixed to the divider plate (25) constituting the edge of the access opening (70) by the bolts (74), thereby fixing the access lid (71) and the divider plate (25) without leaving any gap therebetween. Thus, in the normal operation, the room air in the room upstream of the air filter (30) can reliably be prevented from entering the room downstream of the air filter (30).

Further, since the plurality of radial ribs (27) support the divider plate (25) while connecting the edge of the air hole (26) and the edge of the access opening (70), the rigidity of the divider plate (25) can be increased at the ends of the radial ribs (27). Thus, the access lid (71) can reliably be attached to the edge of the access opening (70).

Other Embodiments

The present embodiments of the invention may be modified in the following manner.

In the embodiment described above, the invention is applied to the filter cleaning of cleaning the filter by abutting the rotating brush (51) to the rotating air filter (30). However, the invention may also be applied to the filter cleaning performed in other way.

The above-described embodiments have been set forth merely for the purposes of preferred examples in nature, and are not intended to limit the scope, applications, and use of the invention.

INDUSTRIAL APPLICABILITY

As described above, the present invention is useful for maintenance of the indoor unit.

DESCRIPTION OF REFERENCE CHARACTERS

10 Casing
21 Indoor fan
25 Divider plate
27 Radial rib
30 Air filter
50 Dust removing section
70 Access opening
71 Access lid
74 Bolt
88 Transfer duct
90 Dust container

The invention claimed is:

1. An indoor unit of an air conditioner comprising:
a casing;
an indoor fan contained in the casing;
an air filter through which air sucked into the casing by the indoor fan passes;
a divider member which includes an inlet port in which the air filter is attached, the divider member being positioned such that the casing is divided into an area upstream of the air filter and an area downstream of the air filter with respect to the direction of an air flow, wherein
room air sucked into the casing through the air filter is conditioned, a dust removing section for removing dust trapped on the air filter is provided in an area upstream of the divider member with respect to the direction of air flow, a decorative panel is provided in an area upstream of the dust removing section, and the divider member includes an opening which allows for checking of the inside of the casing, and a lid member for closing the opening, wherein the lid member substantially blocks the room air from entering the casing through the opening during normal operation; and
an electrical component box containing electrical components of the indoor unit arranged in the casing directly above and downstream, with respect to the direction of air flow, of the opening in the divider member.

2. The indoor unit of the air conditioner of claim 1, wherein the divider member includes a single open region obtained by connecting the opening and the inlet port.

3. The indoor unit of the air conditioner of claim 1, wherein the lid member is attached to the divider member by a fixing member fixed from an upstream side of the divider member in the direction of the air flow.

4. The indoor unit of the air conditioner of claim 1, wherein a dust container for containing the dust which is removed by the dust removing section, and is transferred through a transfer passage is detachably attached to an upstream side of the divider member in the direction of the air flow; and the opening is formed in the divider member to correspond to the dust container.

5. The indoor unit of the air conditioner of claim 2, wherein the divider member is a plate having a plurality of ribs which press a downstream side of the air filter in the direction of the air flow, and extend radially outward from a center of the inlet port, and an end of at least one of the plurality of ribs is attached to an edge of the inlet port, and an end of at least one of the plurality of ribs is attached to an edge of the opening.

* * * * *